United States Patent

[11] 3,540,714

| [72] | Inventor | Alf John Mueller<br>Bittenfeld, Germany |
|---|---|---|
| [21] | Appl. No. | 717,235 |
| [22] | Filed | March 29, 1968 |
| [45] | Patented | Nov. 17, 1970 |
| [73] | Assignee | Daimler-Benz Aktiengesellschaft<br>Stuttgart-Unterturkheim, Germany |
| [32] | Priority | April 1, 1967 |
| [33] | | Germany |
| [31] | | No. D52684 |

[54] TORSION ROD STABILIZER FOR MOTOR VEHICLES
7 Claims, 2 Drawing Figs.

[52] U.S. Cl. .................................................. 267/154, 267/11
[51] Int. Cl. ...................................................... B60g 21/02, F16f 1/14
[50] Field of Search ........................................... 267/57, 11, 1(54)

[56] References Cited
UNITED STATES PATENTS

| 3,181,884 | 5/1965 | Richards | 267/57 |
| 3,388,762 | 6/1968 | Bausch | 267/11 |

*Primary Examiner*—James B. Marbert
*Attorney*—Craig, Antonelli, Stewart & Hill

ABSTRACT: A torsion rod stabilizer for motor vehicles which is secured with lugs arranged at its ends at wheel guide members and is rotatably supported with respect to the vehicle superstructure at the latter in two places, and which is provided with such a bend that the lugs and the center of the bend are disposed on opposite sides of the connecting line of the bearing points at the vehicle superstructure.

Patented Nov. 17, 1970 3,540,714
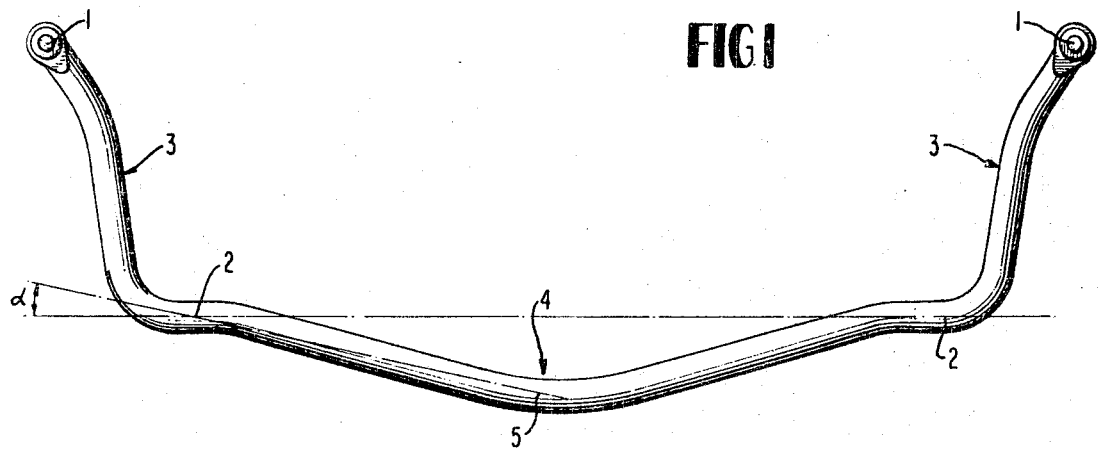
FIG I
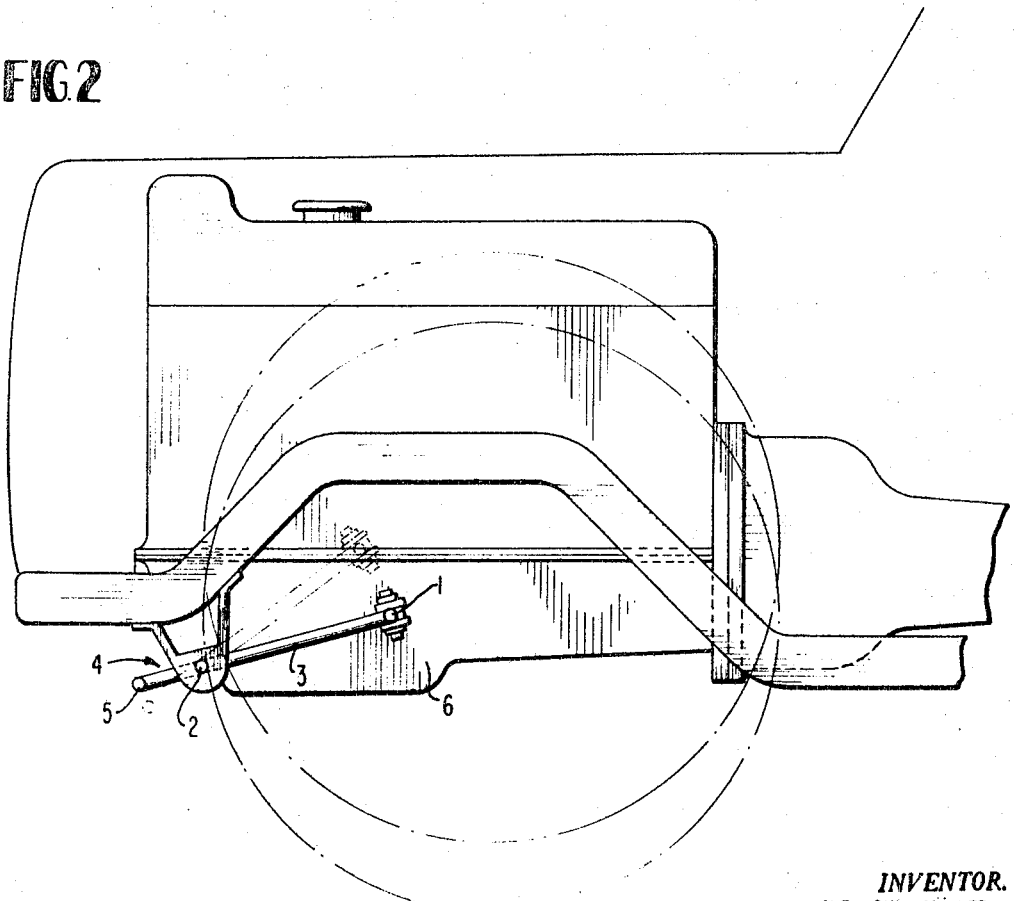
FIG 2
INVENTOR.
ALF JOHN MÜLLER
BY
Craig & Antonelli
ATTORNEYS

TORSION ROD STABILIZER FOR MOTOR VEHICLES

BACKGROUND OF THE INVENTION

The present invention relates to a torsion rod stabilizer for motor vehicles which is so provided with a crank or offset that its spring stiffness is greater compared to the torsion rods known heretofore and which additionally entails the advantage that with strong spring deflections of the wheels it acts as underprotection for sensitive vehicle parts, for example, such as, the engine oil pan.

It is known in the prior art that the arrangement of torsion rod stabilizers at the front or rear axle of motor vehicles encounters difficulties because the space conditions are, for the most part, very limited within the area of the axles. Consequently, the torsion rods had to be provided in general with a crank or offset in order to enable the same to avoid during spring deflections other structural parts such as, for example, the engine oil pan or sump.

The heretofore customary cranked torsion rods, however, entailed the disadvantage that during inward spring deflections their arms carried out larger lateral deflections whereby the space requirement to the wheel and to the vehicle superstructure was increased, and in that by an increase of the bending proportion or component the torsion rods became softer so that their diameter and therewith their weight had to be increased which, in turn, lead to an increase in cost in the torsion rods.

SUMMARY OF THE INVENTION

Accordingly, the present invention is concerned with the task to avoid these disadvantages and to create a torsion rod stabilizer for motor vehicles whose spring stiffness is not only not decreased by the crank or offset but even increased.

Consequently, a torsion rod stabilizer for motor vehicles is proposed in accordance with the present invention which with two lugs arranged at its ends is secured at the wheel guide members and is rotatably supported in two places at the vehicle superstructure to rotate relative thereto, and which is provided according to the present invention with such a bend or offset that the lugs and the center of the bent or offset are disposed on opposite sides of the connecting line of the bearing points at the vehicle superstructure.

According to a particularly advantageous construction of the present invention, the crank or offset is disposed thereby at least approximately within the plane of the torsion rod arms.

It is additionally of advantage if the shape of the torsion rod stabilizer, within the area between the center of the offset and the bearing points at the vehicle superstructure, does not essentially deviate from the straight connecting line of these points.

According to a further preferred construction of the present invention, the angle between the connecting line of the two bearing points and the connecting line between the center of the offset and one of the bearing points is to amount approximately to 10 to 15°.

Accordingly, it is an object of the present invention to provide a torsion rod stabilizer which effectively avoids, by simple means, the aforementioned shortcomings and drawbacks encountered with the prior art constructions.

Another object of the present invention resides in a torsion rod stabilizer for motor vehicles which is so constructed that its spring stiffness is greater than that attainable heretofore with the prior art torsion rods.

A further object of the present invention resides in a torsion rod stabilizer for motor vehicles which can be readily accommodated within the limited space available within the area of the vehicle axles.

Still a further object of the present invention resides in a torsion rod stabilizer for motor vehicles which is not only relatively inexpensive due to the small space requirements and small size thereof but additionally acts as underprotection for certain vehicle parts.

These and further objects, features, and advantages of the present invention will become more obvious from the following description when taken in connection with the accompanying drawing which shows, for purposes of illustration only, one embodiment in accordance with the present invention, and wherein:

FIG. 1 is an elevational view of a torsion rod stabilizer in accordance with the present invention; and FIG. 2 is a partial, somewhat schematic elevational view of a passenger motor vehicle, illustrating the installation of a torsion rod in accordance with the present invention in the front axle of a passenger motor vehicle.

Referring now to the drawing wherein like reference numerals are used throughout the two views to designate like parts, and more particularly to FIG. 1, the torsion rod stabilizer illustrated in this FIG. comprises eyes or lugs 1 to be secured at the wheel guide members (not shown) of any conventional construction, while the bearing support points of the stabilizer at the vehicle superstructure are designated by reference numeral 2; the torsion rod arms disposed between the bearing points 2 and the lugs 1 are generally designated by reference numeral 3, and the center of the offset or crank generally designated by reference numeral 4 is designated by reference numeral 5. The lugs 1 and the center 5 of the offset 4 are thus disposed on opposite sides of the connecting line of the bearing points 2.

The angle α between the connecting line of the bearing points 2 and of the connecting line between the center 5 of the offset 4 and one of the bearing points 2 at the vehicle superstructure amounts in the illustrated embodiment to about 12°. The larger the angle α, the more increases the spring stiffness of the torsion rod during spring deflections because the then-effective lever arm is correspondingly decreased.

In the example of the installation of a torsion rod stabilizer illustrated in FIG. 2, a front section of a passenger motor vehicle is illustrated whereby the front axle and the torsion rod are illustrated in full line in the normal constructional position and—in dash line—in the fully spring-deflected position. It can be readily seen from this FIG. that the torsion rod in the fully spring-deflected position is disposed lower than the oil pan 6 of the vehicle within the area of its offset 4 so that the torsion rod forms in this position an underprotection.

While I have shown and described only one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A torsion rod stabilizer for motor vehicles which is secured with lugs arranged at its ends at wheel guide members and which is rotatably supported with respect to the vehicle superstructure in two places at the latter, characterized in that the torsion rod stabilizer has such an offset that the lugs and the center of the offset are disposed on opposite sides of the bearing points at the vehicle superstructure whereby the spring stiffness of the torsion rod stabilizer is substantially increased.

2. A torsion rod stabilizer according to claim 1, wherein the offset is disposed at least approximately within the plane of the torsion rod arms.

3. A torsion rod stabilizer according to claim 2, wherein the shape of the stabilizer within the area between the center of the offset and the bearing points at the vehicle superstructure does not essentially deviate from the straight connecting line of these points.

4. A torsion rod stabilizer according to claim 3, wherein the angle between the connecting line of the two bearing points and the connecting line between the center of the offset and one of said bearing points amounts to about 10 to 15°.

5. A torsion rod stabilizer according to claim 1, wherein the shape of the stabilizer within the area between the center of the offset and the bearing points at the vehicle superstructure does not essentially deviate from the straight connecting line of these points.

6. A torsion rod stabilizer according to claim 5, wherein the angle between the connecting line of the two bearing points and the connecting line between the center of the offset and one of said bearing points amounts to about 10 to 15°.

7. A torsion rod stabilizer according to claim 1, wherein the angle between the connecting line of the two bearing points and the connecting line between the center of the offset and one of said bearing points amounts to about 10 to 15°.